United States Patent Office 3,418,303
Patented Dec. 24, 1968

3,418,303
COORDINATION CATALYST SYSTEM AND POLYMERIZATION PROCESS
Arthur Livingston Barney and Robert Lee Morgan, Wilmington, Del., assignors to E. I. du Pont de Nemours and Company, Wilmington, Del., a corporation of Delaware
No Drawing. Filed Sept. 16, 1964, Ser. No. 397,025
12 Claims. (Cl. 260—88.2)

ABSTRACT OF THE DISCLOSURE

A coordination catalyst system suitable for polymerization of ethylenically unsaturated hydrocarbon monomers wherein one component is an organo metallic compound of a metal selected from the group consisting of aluminum, magnesium and Group II–B metals; the improvement which consists in a second component of said catalyst being a compound represented by the structures selected from $$[R_4N]^+[VCl_4 \cdot (L)_x]^- \qquad (a)$$

wherein $x$ is 1 or 2; the R radicals are independently selected $C_1$ to $C_{18}$ alkyl and aralkyl groups; and ligand L is an uncharged organic Lewis base, containing an atom selected from the group: sulfur, oxygen, nitrogen and phosphorus atoms capable of donating an unshared electron pair to said vanadium, said ligand being free from carbon-to-nitrogen multibonds and unconjugated carbon-to-carbon multibond, $$[R'_4N]^+[VCl_4 \cdot (RCN)_x]^- \qquad (b)$$

and $$[R'_4N]^+[VCl_4] \qquad (c)$$

wherein the R' radicals are independently selected $C_1$ to $C_{18}$ alkyl groups; R is lower alkyl; and wherein $x$ is 1 or 2.

---

This invention relates to novel tetrachlorovanadate (III) compounds, coordination catalyst systems and their use in the polymerizaiton of olefinic hydrocarbons.

One class of novel compounds of this invention may be represented by the formula $$[R_4N]^+[VCl_4 \cdot (L)_x]^-$$

wherein $x$ is 1 or 2; the R radicals are independently selected from $C_1$ to $C_{18}$ alkyl and aralkyl groups; and ligand L is an uncharged organic Lewis base, containing an atom selected from the group: sulfur, oxygen, nitrogen, and phosphorus atoms capable of donating an unshared electron pair to said vanadium, said ligand being free from carbon-to-nitrogen multibonds and unconjugated carbon-to-carbon multibonds. The definition of the ligand L includes oxygen-bearing compounds, such as ethers, alcohols, aldehydes, carboxylic acids, esters, and ketones; sulfur analogues of the preceding compounds such as sulfides and mercaptans; tertiary amines, tertiary phosphines and phosphites; many suitable ligands within this class have been found, generally having a molecular weight below about 135. Ligand L has no N-atoms joined to carbon by a multiple bond; thus =C=N— and —C≡N groups are not present. Ligand L is free from ethylenic and acetylenic unsaturation; however, an aromatic ring may be present. Ligand L may not be carbon monoxide. Frequently ligand L corresponds to the solvent in which the tetraalkylammonium tetrachlorovanadate (III) was prepared, such as ethanol or acetone. Although ligand L is an electrically neutral molecule when alone, it may in some instances be ionized when present in the novel compounds. Thus, when L is alcohol, the complex anion has the potentiality of giving off a hydrogen ion and acquiring a doubly negative charge.

Another class of compounds to be discussed in relation to this invention may be represented by the formula $$[R'_4N]^+[VCl_4 \cdot (R''C\equiv N)_x]^-$$

wherein $x$ is 1 or 2; R'' is lower alkyl; and the R' radicals are independently selected $C_1$ to $C_{18}$ alkyl or aralkyl groups, preferably the total of carbon atoms present in R' radicals being at least 16. The R'' radical of the nitrile ligand can be $C_1$ to $C_4$ alkyl, e.g., acetonitrile. In the case of the nitrile-liganded compounds the requirement concerning the total number of carbon atoms present in the R' radicals can be important. It has been found that a tetraethylammonium tetrachlorovanadate (III) bisnitrile complex used with diisobutylaluminum chloride was only about half as effective as a coordination catalyst to form an ethylene/propylene copolymer as a catalyst made from a corresponding dimethyldistearylammonium bisnitrile complex. However, even with the higher chain-length R' radicals, coordination catalysts formed with a nitrile complex have been found to be deficient in the formation of ethylene/propylene/1,4-hexadiene terpolymer, although satisfactory to form ethylene/propylene copolymers.

Vanadium compounds which are quite soluble in liquid aromatic hydrocarbons and in methylene chloride, that is, giving a solution as strong as about 0.1 molar at 25° C. can be prepared from both the classes discussed above. In general, the longer the alkyl or aralkyl groups in the ammonium cation, the more soluble the vanadium compound will be in a hydrocarbon medium; thus, the sum of the carbon atoms present in all the R groups of even the first named class of compounds is preferably at least 16; it is also preferable that the groups differ somewhat in length. A representative and preferred cation for both classes is the dimethyldistearyl ammonium cation; the dimethyldibenzyl ammonium cation has been found to be useful. In another representative and preferred cation, 50 mole percent of the R groups are methyl; 12 mole percent are hexadecyl; 37.5 mole percent are octadecyl; and 0.5 mole percent are octadecenyl. The preferred aralkyl radical is a phenyl-substituted alkyl, e.g., benzyl or alkyl substituted benzyl.

The exact procedure most suitable for the preparation of a particular vanadium compound will be readily determined by routine experimentation by those skilled in the art. The most advantageous approach will vary depending upon the nature of the L group. As a general rule, equal molar amounts of vanadium trichloride and the quaternary ammonium chloride compound are stirred together in a solvent; it is frequently most convenient to use a large molar excess of the ligand L as the solvent, the unreacted excess being removed by conventional techniques, such as vacuum distillation, at the conclusion of the reaction. When the ligand-forming compound is a coordination catalyst poison, e.g., ethyl alcohol, it is obvious that the excess ligand reactant should be removed before the coordination catalyst is formed. In some cases, such as when ethyl alcohol is employed as the solvent, the reaction proceeds at room temperature in an hour or less. In some cases, as when acetone is employed, it may be best to heat the agitated mixture at reflux for as long as several hours. The color of the solution of the resulting anion vanadium compound will depend somewhat upon the solvent in which it is prepared. In alcohol it frequently has a greenish cast typical of vanadium III in the hexacoordinate state. It may also display a blue or purple cast, for example in benzene, which is typical of pentacoordinate vanadium III.

In some cases, for example in the formation of the acetone ligand-containing compound, the vanadium salt may precipitate from the ligand-forming solvent. The precipitate can be separated conventionally as for example by filtration or centrifugation. The vanadium compounds prepared and isolated from one reaction medium can, when desired, be dispersed or dissolved in another liquid medium.

The thermal stability of the complex will depend upon the nature of the ligand. In some cases, as for example the acetone and the ethyl alcohol-containing compounds, the ligand is not lost even when the compound is heated under vacuum. In other cases, the ligand is removed by heating under vacuum and the tetraalkylammonium tetrachlorovanadate (III) itself is isolated. This ligand-free salt is indefinitely stable in the absence of moisture and the undesired impurities mentioned above. It may be converted, when desired, into ligand-containing derivatives by reacting it with at least a molar equivalent of the ligand.

Ethyl alcohol is not the only alcohol which forms a firmly bound ligand. The tertiary butyl alcohol complex has been prepared in the hope that the tertiary butyl group would facilitate removal of the alcohol. However, alcohol remained after the complex had been heated under vacuum.

Coordination catalyst systems can be formed with both classes of novel compounds when reacted with organo metallic compounds. Suitable organo metallics are those of the formula $MQX_n$; wherein M is aluminum, magnesium or a Group II-B metal, Q is alkyl, alkenyl, aryl, aralkyl, X is alkyl, alkenyl, aryl, aralkyl, fluorine or bromine, and $n$ is an integer equal to the valence of M minus 1 (e.g., when M is aluminum, $n$ is 2). Within a single compound the X's may differ, e.g., in diisobutylaluminum monochloride. The molecular weight of the organo aluminum compound is not critical; in general practice there is usually no practical advantage in employing compounds wherein the individual Q and X groups have more than about 18 carbon atoms. Dialkyl aluminum monochlorides and dialkyl aluminum monobromides are particularly satisfactory and preferred aluminum compounds. Representative examples of these types include: diisobutyl aluminum monochloride, which is preferred; diethyl aluminum monochloride; diisobutyl aluminum monobromide; and the reaction product of 0.5 mole of aluminum chloride with 1.0 mole of triisobutyl aluminum. Alkenyl, aryl, and aralkyl analogues of these compounds are suitable too. Representative examples include: bis(4-hexenyl)aluminum monochloride; diphenyl aluminum monochloride; bis(p-tolyl)aluminum monochloride; bis(p-chlorophenyl) aluminum monochloride; bis(m-chlorophenyl)aluminum monochloride; bis (3,4-dichlorophenyl)aluminum monochloride; bis(p-fluorophenyl)aluminum monochloride; and dibenzyl aluminum monochloride. As can be seen, inert substituents can be present on the aromatic nucleus of the aryl or aralkyl group.

An alternative and less preferred class includes trihydrocarbyl aluminum compounds such as aluminum trialkyls (and alkenyl analogues thereof), aluminum triaryls, and aluminum triaralkyls. Inert substituents can be on the aromatic nucleus of the aryl or aralkyl group. Representative examples of aluminum trialkyls include: triethyl aluminum; triisopropyl aluminum; triisobutyl aluminum; tri n-amyl aluminum; tri n-decyl aluminum; tri n-hexadecyl aluminum; diethylpropyl aluminum; diisobutyl hexyl aluminum; and diisoamyloctyl aluminum. Representative examples of the other types include: tris (4-hexenyl)aluminum; 4-hexenyldiisobutyl aluminum; triphenyl aluminum; tris(p-tolyl) aluminum; and tribenzyl aluminum.

Typical Group II-B compounds contemplated for use include: diethyl zinc; dibutyl zinc; ethyl magnesium bromide; dimethyl magnesium; dibutyl magnesium; dimethyl cadmium; diphenyl zinc; di(p-tolyl)zinc; diphenyl magnesium; phenyl magnesium bromide; diphenyl cadmium; di(o-tolyl)cadmium; and di(p-chlorophenyl)cadmium.

The coordination catalysts can be made by combining the vanadium compounds and the organo metallic compounds in the conventional way. The usual inert liquid media can be employed such as hydrocarbons and chlorinated hydrocarbons. The types include alkanes (e.g., n-heptane); cycloalkanes (e.g., cyclohexane); aromatic hydrocarbons (e.g., benzene); chlorinated alkanes (e.g., methylene chloride); chlorinated alkenes (e.g., tetrachloroethylene); and chlorinated aromatic hydrocarbons (e.g., o-dichlorobenzene). If a medium is used which is a poor solvent for the novel vanadium compounds, they are added to it as a solution in a good solvent.

The usual precautions taken during the preparation of coordination catalysts, such as exclusion of air and water, are observed here. The catalyst can be made in the presence of part or all of the monomers to be polymerized or it can be premixed. It is preferred to prepare and employ the catalysts at temperatures below room temperature, for example 0° or 10° C. The catalyst activity tends to decay undesirably fast for many purposes at temperatures above 25° C. Those skilled in the art can determine by routine experimentation the relative proportions of catalyst components which will give the best results in a particular system. Thus, for making ethylene/propylene/1,4-hexadiene copolymer in benzene at 10° C. with a dimethyldistearylammonium tetrachlorovanadate (III) (ethanol complex)/diisobutylaluminum monochloride catalyst, the Al:V atomic ratio should have a value of at least 4.

The coordination catalysts prepared from the compounds of the present invention can be used to make homopolymers and copolymers of the α-monoolefins and non-conjugated dienes customarily used in the art. Thus, α-monoolefins such as ethylene, propylene, 1-butene, 1-hexene, and 1-octadecene can be employed. A particularly valuable application is the preparation of ethylene/propylene copolymers. In addition to the α-monoolefins a non-conjugated diene can also be present. Representative non-conjugated dienes include the open-chain dienes disclosed in U.S. Patent 2,933,480; the alkyl norbornadienes disclosed in U.S. Patent 3,063,973; the alkenyl norbornenes disclosed in U.S. Patent 3,093,620; 5-methylenenorbornene disclosed in U.S. Patent 3,093,621; and dicyclopentadiene disclosed in U.S. Patent 3,000,866. It is frequently advantageous when making rubber-like vulcanizates to employ about 20 to 70% by weight ethylene monomer units in the copolymer. Representative terpolymers made with these catalysts include ethylene/propylene/1,4-hexadiene; ethylene/propylene/dicyclopentadiene; ethylene/propylene/5-methylene norbornene; and ethylene/propylene/1,5-cyclooctadiene.

The invention will now be described with reference to the following examples of specific embodiments thereof wherein parts and percentages are by weight unless otherwise specified.

EXAMPLE 1

To a 200-ml. glass reaction flask equipped with an agitator are added: 1.6 grams (0.01 gram-mole) of vanadiumtrichloride, 5.7 grams (0.01 mole) of dimethyldistearyl-ammonium chloride and 50 ml. of absolute alcohol. A suitable quarternary ammonium chloride is "Arquad F 2HT-75" commercially available from Armour Co. having the formula

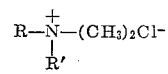

where R and R' have the following mole percent composition: 24% hexadecyl, 75% octadecyl and 1% octadecenyl; the formula weight is 571. After 30 minutes' agitation under nitrogen at 25° C. solvent is removed from the resulting emerald solution by evaporation at 25° C. The maroon ethanol complex left behind is dried under vacuum (0.1 mm. Hg) at 60–70° C. for about 4 hours. The resulting ethanol complex dissolves readily in benzene to form a 0.1 molar solution at 25° C. The reaction may be represented as follows:

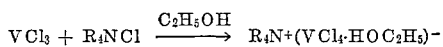

While this structure of the product is probably quite accurate for the material in the solid state and in less basic solvents, in an alcoholic solution the structure may better be represented:

When dilute methylene chloride or benzene solutions of the product are cooled, the color changes from blue to green and it is believed that the color changes with the following equilibrium:

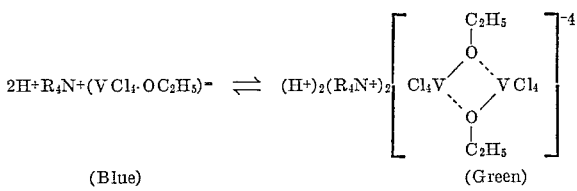

Derivatives of the ethanol-complex product of this example are prepared using the appropriate quaternary ammonium chloride, wherein the alkyl group on the nitrogen is substituted by methyl, ethyl, butyl, hexyl, heptyl, and benzyl radicals. The symmetrical longer chain alkyl derivatives are soluble in methylene chloride and chloroform but are insoluble in benzene and tetrachloroethylene. The ethanol complex of dibenzyldimethylammonium tetrachlorovanadate is soluble in methylene chloride.

EXAMPLE 2

Example 1 is repeated except that 1.715 grams (0.0104 gram-mole) of tetraethylammonium chloride is used as the quarternary ammonium compound and the amount of $VCl_3$ is increased to 0.0104 gram-mole. The ethanol complex of tetraethylammonium tetrachlorovanadate is obtained as a maroon residue. Calculated for

C, 32.5; H, 7.0; Cl, 38.5. Found: C, 33.0; H, 7.8; and Cl, 38.3.

EXAMPLE 3

Example 1 is repeated except that 50 ml. of acetone is used instead of ethanol. After warming the mixture under nitrogen a deep blue solution forms. Upon cooling, the unreacted acetone is removed under vacuum at 25° C. The solid lavender acetone complex of dimethyldistearylammonium tetrachlorovanadate isolated is dried for 4 hours at 50–60° C. at 0.1 mm. Hg.

EXAMPLE 4

Example 3 is repeated using 1.7 grams (0.01 gram-mole) of tetraethylammonium chloride as the quarternary ammonium compound. The acetone complex of tetraethylammonium tetrachlorovanadate is obtained as magenta crystals. Calculated for $C_{11}H_{26}Cl_4NOV$: C, 34.7; H, 6.8; Cl, 37.3. Found: C, 35.4; H, 7.4; and Cl, 36.9.

EXAMPLE 5

(A) Example 1 is repeated using 2.85 grams (0.005 gram-mole) of distearyldimethylammonium chloride, 0.8 gram (0.005 gram-mole) of vanadium trichloride, and 40 ml. of dry acetonitrile. The resulting suspension is heated at 80° C. for 2 hours. After the unreacted acetonitrile is removed under vacuum at 25° C. from the blue-colored solution, the benzene-soluble bis(acetonitrile) complex of dimethyldistearylammonium tetrachlorovanadate is obtained as a benzene-soluble green solid in essentially quantitative yield.

(B) If the above-prepared complex is heated at about 70° C. (<1 mm. Hg) for about 8 hours, a ligand-free benzene-soluble dimethyldistearylammonium tetrachlorovanadate (III) compound is obtained as a deep blue-black solid.

EXAMPLE 6

A molar equivalent of anhydrous trimethylamine is added to an agitated solution of dimethyldistearylammonium tetrachlorovanadate (III) in inhibitor-free chloroform at 25° C. at atmospheric pressure under nitrogen. After 30 minutes, the solvent is removed from the blue-colored solution under vacuum to yield the trimethylamino complex of dimethyldistearylammonium tetrachlorovanadate as a blue solid which is soluble in benzene.

EXAMPLE 7

The procedure of Example 6 is repeated except as follows. More than two molar equivalents of anhydrous trimethylamine are added to a solution of the dimethyldistearylammonium tetrachlorovanadate (III) in benzene at 25° C. After the mixture has been agitated for 30 minutes at 25° C., solvent and unreacted trimethylamine are removed from the brown suspension under vacuum at 25° C. The bis(trimethylamine) complex of dimethyldistearylammonium tetrachlorovanadate left behind is a brown solid which is sparingly soluble in benzene. Analysis indicates that the V:Cl:N atoms are contained in the complex in the molar proportions 1:4:3.

EXAMPLE 8

The procedure of Example 7 is repeated except that dimethylsulfide is substituted for trimethylamine. Removal of unreacted dimethylsulfide and solvent from the resulting deep blue solution gives the bis(dimethylsulfide) complex of dimethyldistearylammonium tetrachlorovanadate as a blue solid.

EXAMPLE 9

The procedure of Example 7 is repeated except that one mole of trimethylphosphite is substituted for trimethylamine. The solution is stirred under nitrogen for 2 hours at 25° C. Removal of volatiles under vacuum from the blue solution gave the phosphito complex as a blue solid which was soluble in benzene.

EXAMPLE 10

To a solution of dimethyldistearylammonium tetrachlorovanadate (III) in benzene at 25° C. is added an equimolar portion of triphenylphosphite. After the resulting mixture solution has been stirred for 16 hours under nitrogen at 25° C., the triphenylphosphino complex of the vanadate is obtained as a blue solution.

EXAMPLE 11

The procedure of Example 10 above is repeated except that triphenylphosphite is employed in place of triphenylphosphine. The triphenylphosphite complex of dimethyldistearylammonium tetrachlorovanadate is obtained as a blue solution.

EXAMPLE 12

Dimethyldistearylammonium tetrachlorovanadate (III) is dissolved in a molar excess of tetrahydrofuran at 25° C. under a nitrogen atmosphere. After the resulting solution has been heated for one hour at about 66° C. while agitated, the unreacted tetrahydrofuran is removed from the blue-colored solution under vacuum (0.1 mm. Hg) at 45° C. to give the tetrahydrofurano complex of the vanadate as a blue-colored solid which is soluble in benzene.

EXAMPLE 13

To a solution of dimethyldistearylammonium tetrachlorovanadate (III) in benzene at 25° C. is added an equimolar portion of trifluoroacetic acid. After the resulting mixture has been stirred for 6 hours at 25° C., the trifluoroacetoxy complex of the vanadate is obtained as a deep maroon solution.

EXAMPLE 14

To a flask equipped with an agitator are added in a nitrogen atmosphere: 1.57 grams (0.01 gram-mole) of vanadium trichloride, 1.65 grams (0.01 gram-mole) of tetraethylammonium chloride, and 40 ml. of dry acetonitrile. The resulting suspension is warmed while being stirred until a deep blue solution is formed. Upon cooling, tetraethylammonium tetrachlorovanadate (III)-bis(acetonitrile) is deposited as a green solid precipitate which is filtered off and dried in vacuum at room temperature. Calculated for $C_{12}H_{26}N_3Cl_4V$: C, 35.6; H, 6.4; Cl, 35.1. Found: C, 36.1; H, 6.8; Cl, 34.8.

A sample of the complex is heated is 80° C. at <1 mm. Hg for several hours. The pale green powder turns blue-black as the ligand-free tetraethylammonium tetrachlorovanadate (III) is formed. Calculated for $C_8H_{20}Cl_4NV$: C, 29.7; H, 6.3. Found: C, 30.3; H, 6.5.

A suspension of tetraethylammonium tetrachlorovanadate (III) in chloroform is treated with more than 2 molar equivalents of dimethylsulfide. The resulting pink solid bis(dimethylsulfide) of the vanadate is filtered off under nitrogen and dried for analysis in vacuum. Calculated for $C_{12}H_{32}Cl_4NS_2V$: C, 32.3; H, 7.15. Found: C, 32.2; H, 7.5.

EXAMPLE 15

To a suspension of tetraethylammonium tetrachlorovanadate (III) in chloroform (inhibitor-free) is added a molar excess of trimethylphosphite. The resulting solid trimethylphosphite complex of the vanadate is filtered off and dried in vacuum at 60° C. Calculated for $C_{11}H_{29}Cl_4NO_3PV$: C, 29.7; H, 6.5; P, 6.94. Found: C, 29.8; H, 6.7; P, 6.10.

EXAMPLE 16

Tetraethylammonium tetrachlorovanadate (III) is suspended in tetrahydrofuran in a nitrogen atmosphere and heated under reflux to effect solution. Upon cooling, the solid tetrahydrofuran derivative of the vanadate complex which precipitates is filtered off under nitrogen and dried at 50° C. in vacuum. Calculated for $C_{12}H_{28}Cl_4NOV$: C, 36.4; H, 7.1; V, 12.9; Found: C, 36.0; H, 7.5; V, 13.5.

EXAMPLE 17

The reactor is a 4-neck 500-ml. glass resin kettle equipped with a glass agitator, an immersion thermometer, gas inlet and outlet tubes, and a liquid inlet port covered with a serum cap. After 500 ml. of benzene has been charged and cooled to 10° C. under a nitrogen atmosphere, a gas mixture is introduced supplying ethylene and propylene at the respective rates of 0.8 and 3.2 liters per minute. The back pressure on the system is 40 centimeters of mercury. Five minutes later the copolymerization reaction is started by forming a coordination catalyst in situ by adding, in turn, 5 ml. of a 0.1 molar benzene solution of the ethanol complex of dimethyldistearylammonium tetrachlorovanadate (III) and 4 ml. of a 1.0 molar n-hexane solution of diisobutyl aluminum monochloride. The molar ratio of aluminum:vanadium is thus about 8:1. For 20 minutes the reaction is stirred at 10° C. while monomer gases are supplied at the above-described rates. The catalyst is then deactivated by introducing 5 ml. of isopropyl alcohol. Total removal of the solvent under vacuum typically yields about 9.3 grams of ethylene/propylene copolymer which contains about 59% propylene monomer units by weight.

EXAMPLE 18

The procedure of Example 17 above is repeated except that 6 ml. of 1,4-hexadiene are introduced into the benzene solution before the addition of the coordination catalyst components. Typically there is obtained about 9.5 grams of ethylene/propylene/1,4-hexadiene copolymer containing about 47% by weight propylene monomer units and 3.3% by weight trans-1,4-hexadiene monomer units.

EXAMPLE 19

The procedure of Example 17 above is repeated except that 500 ml. of tetrachloroethylene is employed in place of the 500 ml. of benzene called for. Typically there is obtained 6.3 grams of ethylene/propylene copolymer containing 49% propylene monomer units by weight.

EXAMPLE 20

A 2.85-gram portion (0.005 gram-mole) of dimethyldistearylammonium chloride which has been dried for 2 hours at 100° C. under vacuum is combined with 0.8 gram (0.005 gram-mole) of vanadium trichloride in 50 ml. of dry acetonitrile at 25° C. under a nitrogen atmosphere. After the mixture has been stirred for about 2 hours under nitrogen at 80° C., the unreacted acetonitrile is removed under vacuum at 25° C. The bis(acetonitrile) complex of the vanadate is then heated at 70–75° C. at 0.1–0.4 mm. of mercury for about 16 hours. The ligand-free dimethyldistearylammonium tetrachlorovanadate (III) thereby obtained is dissolved in 97 ml. of benzene at 25° C. under nitrogen.

EXAMPLE 21

The procedure of Example 17 is repeated except that 10 ml. of the dimethyldistearylammonium tetrachlorovanadate benzene solution prepared in Example 20 above is substituted for the ethanol complex of the tetrachlorovanadate solution called for. Typically there is obtained a 13-gram yield of ethylene/propylene copolymer containing about 59% by weight propylene monomer units.

EXAMPLE 22

The procedure of Example 21 above is repeated except that 6 ml. of 1,4-hexadiene is introduced before the coordination catalyst components. Typically there is obtained a 4-gram yield of ethylene/propylene/1,4-hexadiene copolymer containing about 44% by weight propylene monomer units and 3.8% by weight trans-1,4-hexadiene monomer units.

EXAMPLE 23

(A) About 2.6 grams (0.01 mole) of dimethyldibenzylammonium chloride is reacted overnight in 50 ml. nitromethane with about 1.5 grams (0.01 mole) of vanadium trichloride under nitrogen at 25° C. The filtrate thereof is concentrated; a methylene chloride extract of the resulting residue yields about 4.2 grams (0.01 mole) of dimethyldibenzylammonium tetrachlorovanadate. Essentially the same results are obtained by using methylene chloride as the reaction solvent and concentrating afterward.

A coordination catalyst is formed in situ by adding 0.2 gram of the vanadate (dissolved in benzene) to 500 ml. of monomer saturated methylene chloride in the reactor of Example 17 and subsequently introducing a 0.1 molar n-hexane solution of diisobutyl aluminum chloride (hereinafter called DIBAC) over a period of about 45 minutes.

Ethylene and propylene are introduced into the reactor at the rates 0.5 liter/min. and 2.1 liters/min., respectively, at all times. The DIBAC addition is such that the Al:V mole ratio ranges from 1 to 16 and the reaction temperatures range from about 5° to 12° C. After the reaction has been stopped by adding isopropyl alcohol, about 6.5 grams of ethylene/propylene copolymer is filtered off containing about 53% propylene monomer units.

(B) A terpolymer can be prepared by following the above procedure except as follows: 6 ml. of 1,4-hexadiene is added to the reactor before the catalyst components and the amount of DIBAC is 8 ml. of a 1 molar solution. The Al:V ratio is about 8:1. The reaction time is about 20 min. and the temperature is 5°±1° C. The reaction is deactivated with 10 ml. of isopropyl alcohol. About 2 grams of terpolymer is obtained containing about 45% propylene and 4.5% 1,4-hexadiene.

(C) The acetone-liganded complex of dibenzyldimethylammonium tetrachlorovanadate is prepared by combining 0.01 mole of vanadium trichloride with 0.01 mole of dimethyldibenzylammonium chloride in acetone solution at 25° C. and then heating briefly at reflux. The product is filtered off under nitrogen as a lavender solid. This solid can be used as the vanadium component of a coordination catalyst system according to the teachings of Part A except as follows: 0.2 gram (0.0005 mole) of the complex is dissolved in methylene chloride and added to 500 ml. benzene along with 4 ml. of 1 molar DIBAC. The Al:V ratio is 8/1. Propylene and ethylene are introduced at rates of 3.2 liters/min. and 0.8 liter/min., respectively, for a period of 20 minutes. The reaction temperature is about 10° C. and about 2.8 grams of an ethylene/propylene copolymer is obtained containing about 48% propylene monomer units. The ethanol liganded complex of the above vanadate can be prepared and used for the copolymerization of ethylene and propylene in an essentially identical manner.

In accordance with this invention coordination catalyst systems can be prepared which are highly useful for the polymerization of $\alpha$-olefins, especially with non-conjugated hydrocarbon dienes. These have been found to be unexpectedly superior to those systems formed using the known acetonitrile complex of tetraethylammonium tetrachlorovanadate.

While known vanadium coordination catalyst systems typically display a polymerization retardation as much as three- or four-fold in the presence of certain non-conjugated hydrocarbon dienes (e.g., 1,4-hexadiene) systems can be prepard using compounds of this invention which display no significant retardation.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a coordination catalyst system suitable for polymerization of ethylenically unsaturated hydrocarbon monomers wherein one component is an organo metallic compound of a metal selected from the group consisting of aluminum, magnesium and Group II–B metals; the improvement which consists in a second component of said catalyst being a compound represented by the structure $$[R_4N]^+[VCl_4 \cdot (L)_x]^-$$

wherein $x$ is 1 or 2; the R radicals are independently selected $C_1$ to $C_{18}$ alkyl aralkyl groups; and ligand L is an uncharged organic Lewis base, containing an atom selected from the group: sulfur, oxygen, nitrogen and phosphorus atoms capable of donating an unshared electron pair to said vanadium, said ligand being free from carbon-to-nitrogen multibonds and unconjugated carbon-to-carbon multibonds.

2. A catalyst system as defined in claim 1 wherein the total of carbon atoms present in said R radicals is at least 16.

3. A catalyst system as defined in claim 1 wherein said [R₄N]⁺ is a dimethyldistearylammonium cation.

4. A catalyst system as defined in claim 1 wherein said ligand L is selected from the group consisting of ethanol, acetone, trimethylamine, dimethyldisulfide, trimethylphosphite, triphenylphosphine, triphenylphosphite, tetrahydrofuran and trifluoroacetic acid.

5. A catalyst system as defined in claim 1 wherein said organo metallic compound is a dialkyl aluminum halide wherein the alkyl group contains less than 18 carbon atoms and the halogen is selected from the group consisting of chlorine and bromine.

6. A coordination catalyst system comprising diisobutylaluminum chloride and the ethanol complex of dimethyldistearylammonium tetrachlorovanadate.

7. In a coordination catalyst system suitable for polymerization of ethylenically unsaturated hydrocarbon monomers wherein one component is an organo metallic compound of a metal selected from the group consisting of aluminum, magnesium and Group II–B metals; the improvement which consists in a second component of said catalyst being a compound represented by the structure $$[R'_4N]^+[VCl_4 \cdot (RC\equiv N)_x]^-$$

wherein $x$ is 1 or 2; R is lower alkyl; and the R' radicals are independently selected from $C_1$ to $C_{18}$ alkyl and aralkyl groups.

8. A catalyst system as defined in claim 7 wherein $RC\equiv N$ is acetonitrile and the total number of carbon atoms present in the R' radicals is at least 16.

9. A catalyst system as defined in claim 8 wherein $[R'_4N]^+$ is a dimethyldistearylammonium cation.

10. In a coordination catalyst system suitable for polymerization of ethylenically unsaturated hydrocarbon monomers wherein one component is an organic metallic compound of a metal selected from the group consisting of aluminum, magnesium and Group II–B metals; the improvement which consists in a second component of said catalyst being a compound represented by the structure $$[R'_4N]^+[VCl_4]^-$$

wherein the R' radicals are independently selected $C_1$ to $C_{18}$ alkyl groups, the total of carbon atoms present in R' radicals being at least 16.

11. In a process of polymerizing ethylene with non-conjugated hydrocarbon dienes of about 6 to 22 carbon atoms in the presence of a coordination catalyst; the improvement which consists in the use in such process of the coordination catalyst system defined in claim 1.

12. In a process of polymerizing ethylene with non-conjugated hydrocarbon dienes of about 6 to 22 carbon atoms in the presence of a coordination catalyst; the improvement which consists in the use in such process of the coordination catalyst system defined in claim 7.

References Cited

UNITED STATES PATENTS

| | | | |
|---|---|---|---|
| 3,277,069 | 10/1966 | Natta et al. | 260—93.7 |
| 3,340,241 | 9/1967 | Natta et al. | 260—93.7 |
| 3,349,064 | 10/1967 | Gumboldt et al. | 260—94.9 |

OTHER REFERENCES

Croatica Chemica Acta, 33, 157–168 (1961) (pp. 157–168).

JOSEPH L. SCHOFER, *Primary Examiner.*

M. B. KURTZMAN, *Assistant Examiner.*

U.S. Cl. X.R.

260—429, 80.78